US006823188B1

(12) United States Patent
Stern

(10) Patent No.: US 6,823,188 B1
(45) Date of Patent: Nov. 23, 2004

(54) AUTOMATED PROXIMITY NOTIFICATION

(75) Inventor: Edith H. Stern, Boca Raton, FL (US)

(73) Assignee: International Business Machines Corporation, Armonk, NY (US)

(*) Notice: Subject to any disclaimer, the term of this patent is extended or adjusted under 35 U.S.C. 154(b) by 703 days.

(21) Appl. No.: 09/625,928

(22) Filed: Jul. 26, 2000

(51) Int. Cl.[7] .............................. H04Q 7/20; H04B 5/00

(52) U.S. Cl. ................ 455/456.1; 455/41.2; 455/414.2; 455/456.2; 455/414.3

(58) Field of Search .......................... 455/456, 41, 457, 455/550, 556, 557, 566, 435, 440, 67.1, 414, 403, 418, 419, 420, 456.1, 456.2, 456.3, 41.2, 41.3, 866, 414.1, 414.2, 414.3, 435.1

(56) References Cited

U.S. PATENT DOCUMENTS 5,559,520 A * 9/1996 Barzegar et al. ......... 342/357.1
5,835,061 A * 11/1998 Stewart ....................... 342/457
5,995,015 A * 11/1999 DeTemple et al. ...... 340/825.49
6,332,082 B1 * 12/2001 Fuller et al. ................ 455/461
6,452,498 B2 * 9/2002 Stewart ................... 340/573.1
6,480,713 B2 * 11/2002 Jenkins .................... 455/412.1
2001/0041576 A1 * 11/2001 I'Anson et al. ............. 455/456
2001/0055976 A1 * 12/2001 Crouch et al. .............. 455/456
2002/0111173 A1 * 8/2002 Hendrey et al. ............ 455/456

FOREIGN PATENT DOCUMENTS

WO WO 9636193 A 11/1996
WO WO 9858506 A 12/1998

* cited by examiner

*Primary Examiner*—Nick Corsaro
*Assistant Examiner*—Edan Orgad
(74) *Attorney, Agent, or Firm*—Robert Lieber; Richard A. Tomlin

(57) ABSTRACT

The disclosed system and method for automated proximity determination and notification is useful to enable a customer or client of a business or other enterprise (e.g. a public library, a government facility, etc) to automatically obtain a predetermined service, on arrival at a destination associated with the business or enterprise, without having to communicate orally with representatives of the business/enterprise. A portable programmable wireless communication device is carried by users of such services. The device, termed a PLAD (pervasive location aware device), receives a program and proximity notification parameters associated with each destination to be visited, when service is reserved relative to the destination. Thereafter, as its user travels to the destinations, the PLAD is activated and uses the program information and parameters acquired in the reservation process to perform a proximity notification transmission characteristic of this invention as the device reaches a predetermined range of proximity to a destination. For that purpose, the PLAD calculates its distance to each currently valid destination at which a service is reserved, and sends a proximity notification signal to an address associated with a respective destination when its distance to the respective destination is less than a predetermined threshold radius limit acquired during the reservation process. Receiving equipment at the address uses the proximity notification signal to arrange for prompt execution of a reserved service when the user of the PLAD arrives at the respective destination. The PLAD also can be used in a reverse context—when its user is at a specific location and the service is being delivered to that location by a vehicle carrying another PLAD operated by or for a business/enterprise—to alert the user to the imminent arrival of that vehicle.

24 Claims, 4 Drawing Sheets

AUTOMATED PROXIMITY NOTIFICATION

BACKGROUND OF THE INVENTION

Presently available technology supports position location functions, enabling mobile equipment to accurately indicate geographic positions to respective users, and even guide such users to preset destinations. Other available technology (exemplified for instance by systems which communicate with cellular radio-telephones and operate to automatically link the latter devices with different signal relay towers as such devices move between areas served by such towers) can be used to derive position information from cellular devices (e.g. for use in "911" emergencies).

Industries providing travel-related services—exemplified by automobile rental enterprises, airlines, railroads, buses, cruise ship operators, hotels, food caterers, etc.—increasingly seek to attract customers with special value-added services. Typically such service are given names associated with valuable objects (platinum, gold, diamonds, etc.). For example, one car rental company offers a "gold card" service whereby customers entitled to the service, while being transported from an airport to a nearby company terminal, identify themselves to the bus driver who in turn notifies representatives at the terminal. As a result, rental cars assigned to passengers so identified are made immediately available at the terminal, eliminating need for such customers to enter the branch office, wait for a representative to serve them, complete forms, etc. A similar service, offered by hotels, provides guests with transportation from nearby airports to respective hotels when guests telephone to announce their arrival at the airport.

A common aspect of the foregoing services is that their implementation usually requires overt actions by guests (or customers or clients, etc.) upon arrival at a travel terminal close to a place of business offering the service. An aspect of presently known services of this character is that the required overt acts usually involve oral communication, between the arriving guest and a representative of the business offering the service, to identify the arriving guest, and may even require the guest to locate and display a card indicating their entitlement to the service.

In the rush of travel, it is frequently difficult and/or awkward for guests to carry out such acts of identification. Furthermore, this difficulty or awkwardness may be compounded if the communications and acts need to be carried out in a particular place (e.g. at a telephone in an air terminal, or on a shuttle van, etc.) where the act may be impeded by crowds of travelers or vehicle motion or both.

Accordingly, a need is perceived for providing such service on an automated basis which effectively would relieve guests/clients (hereafter "users") of burdens of communicating orally with representatives of businesses providing the service, and perhaps more importantly is conditioned upon automated telecommunication functions which can be programmed to occur automatically when users reach a pre-arranged distance of proximity to a destination associated with the service. Thus, for instance, services associated with expediting baggage check-in at airports can be triggered into effect as users of the service enter airport grounds, services expediting delivery of rental cars to users arriving at an airport can be triggered into effect as users arrive, services for expediting transportation from air terminals to hotels can be triggered into effect when users arrive at the air terminals, services to expedite take-out catering functions can be activated when a user is within a few blocks of a respective catering service site, etc.

SUMMARY OF THE INVENTION

In accordance with this invention, users of presently contemplated services employ state of art programmable portable instruments that are adapted to be programmable to be effectively aware of their locations and to begin automatic transmissions of pre-arranged signals (typically, in a wireless mode), to business sites providing the services, as respective users reach a predetermined distance of proximity to such sites. The pre-arranged signals include signals identifying respective users.

Preferably, programming of such instruments is effected before or during a trip to a destination offering the service. Such programming is implemented, through wireless or other data communication networks, either by businesses providing the services or third parties operating as agents of these businesses. Furthermore, the pre-arranged, signal transmissions preferably are in a standardized form enabling different types of businesses (requiring different proximity factors for beginning activation of their services and different actions for implementing respective services) to use common reception equipment to: a) properly identify authorized users of their services, and b) begin activating respective services exclusively for such users. Furthermore, such programming preferably is sufficiently flexible to allow different businesses to establish different proximity conditions for triggering user-identifying transmissions.

Although portable instruments that are programmable to be effectively aware of their locations are presently state of the art, a distinction of the present invention is that its instruments are programmable by diverse entities or persons to perform presently contemplated signaling functions as users of the instruments reach predetermined proximity to sites at which services and/or functions associated with their programming are to be completed.

Instruments generally "aware" of their geographic locations (either by communications with earth satellites or with cellular relay stations) are presently termed "pervasive location aware/communicating devices" (abbreviated as "PLAD's"). Instruments that are specifically adaptable to receiving programming associated with presently contemplated services, and to perform presently contemplated signal transmissions conditioned on proximity factors, are viewed presently as a new class of PLAD's.

As presently contemplated, a common aspect of this new class is that its PLAD's are subject to being dynamically programmed, before or during a visit to a specific site at which a service or other function is to be performed, to: a) detect when the PLAD (and its user) are within a predetermined range of proximity to the site; and b) upon such detection, initiate transmission of information enabling apparatus receiving the transmissions to verify that they are from a user of a pre-scheduled service and initiate actions appropriate for implementing the service in synchronism with the user's projected time of arrival at the site. It is contemplated further that PLAD's in this class will be adaptable to receive transmissions from or associated with proximate sites, in order to support implementation of applications which require bidirectional transmissions; applications requiring verification that the respective PLAD is in possession of an authorized user.

Programming of a PLAD instrument in this new class should be simple, flexible and dynamically variable so as to allow e.g. for supporting triggering of several different proximity-associated service applications in the course of a single trip; for instance, triggering of a first application en route to a departure airport (e.g. enabling the device user to obtain a seat assignment on a scheduled flight, and possibly to-schedule baggage handling automatically, while en route to that airport), and triggering of a second service application upon arrival at a destination airport (e.g. enabling the same user/traveler to have a shuttle van automatically dispatched to the airport from either a car rental service or a pre-booked hotel at that time).

Presently contemplated PLAD's also can be used to set up proximity-related control functions. For example, an incoming guest's proximity notification to a hotel can be used to initiate a room thermostat adjustment, so that the room temperature is comfortable when the guest arrives but can be efficiently held at a less comfortable setting while the room is unoccupied.

Also, such control functions can be exerted in a reverse sense, as a PLAD's user moves away from a given site. For example, it can function relative to a user's home to automatically arm security systems that a user has forgotten to manually set, adjust temperatures, turn off unnecessary lighting, shut off appliances accidentally left on, etc, as a user travels away from his/her home.

Software supporting such applications can be transferred to PLAD's in this new class by various means that may presently be known in other contexts. It could be downloaded through existing or new communication networks; such as the Internet, the PSTN (public switched telephone network), existing radio-telephone networks, etc. Alternatively, it could be transferred directly to the device from a computer, via an associated adapter. In the latter form of transfer, the computer could be a computer located at the user's residence or office, a computer located at an airport or rail terminal, etc.

Features of this invention are:

- programming of portable and programmable PLAD (pervasive location aware devices) communication devices to provide proximity notification and user identification signals to specifically addressed destinations as devices reach predetermined proximity ranges to such destinations
- use of such devices to enable businesses receiving the foregoing notification and identification signals to prearrange for providing special services to respective users as they arrive at respective destinations
- use of such devices to accommodate different proximity ranges for different destinations
- configuring such devices to be programmable to provide the foregoing signals through a variety of communication networks as well as through PC's (personal computers) and a variety of storage media used by PC's
- configuring such devices so that proximity ranges associated with services to be provided can be varied to accommodate service requirements of many different business, government, personal and other types of users
- configuring such devices so that software pertaining to a given service can be downloaded thereto when an authorized user of the device reserves a given service relative to a specific business
- configuring such devices to be able to store software pertaining to a given service in reusable form
- configuring such devices to accommodate software applications pertaining to varied services at a plurality of destinations, and also to be able to store and execute such applications simultaneously while the device user is en route sequentially to those destinations
- use of such devices in a manner ensuring user privacy; e.g. with proximity notification signals giving the user's proximity to a destination without revealing the user's location
- use of such devices to receive proximity notifications in situations wherein the device user is stationary and the service is being brought to that user in a mobile vehicle
- use of such devices to provide services in a "no-waiting" mode that are available on the user's arrival at a destination
- use of such devices and their software to provide functions ancillary to proximity notification; e.g. "look-ahead information" preparing a device user in a car to be able to avoid congestion conditions on roads (for example, advising the user of best immediate routes to a destination, and alerting the user to take detours where needed) and at bridges and tunnels along a route (for example, enabling the user to aim for a specific least-congested toll booth)
- use of PLAD's to communicate with notification services independent of businesses at service destinations; e.g. to support service applications requiring frequent exchanges of information and possible redirection of a user (for example, a service in which the facility communicating with the user directs the user to a nearest garage with space available in a given area of a large city or to a nearest parking facility with space available at a busy airport, or alerts the user to traffic congestion problems and possible avoidances along the user's current route, etc)
- use of PLAD's to provide or augment PIM (personal information manager) scheduling functions
- use of PLAD's to provide proximity-associated functions in a reverse sense; i.e. based on a user's range of remoteness from a starting site such as the user's home
- use of PLAD's to provide proximity-proximity notification from mobile service providers such as taxicabs to stationary service recipients
- use of PLAD's to sustain new business functions; e.g. airlines could offer special discounts to customers who agree to use PLAD's en route to airports and relinquish seats if they are a predefined distance from the airport at predefined times before scheduled flight departures.

These and other uses and features of this invention will be more fully understood from the following description.

DETAILED DESCRIPTION

Figure 1:
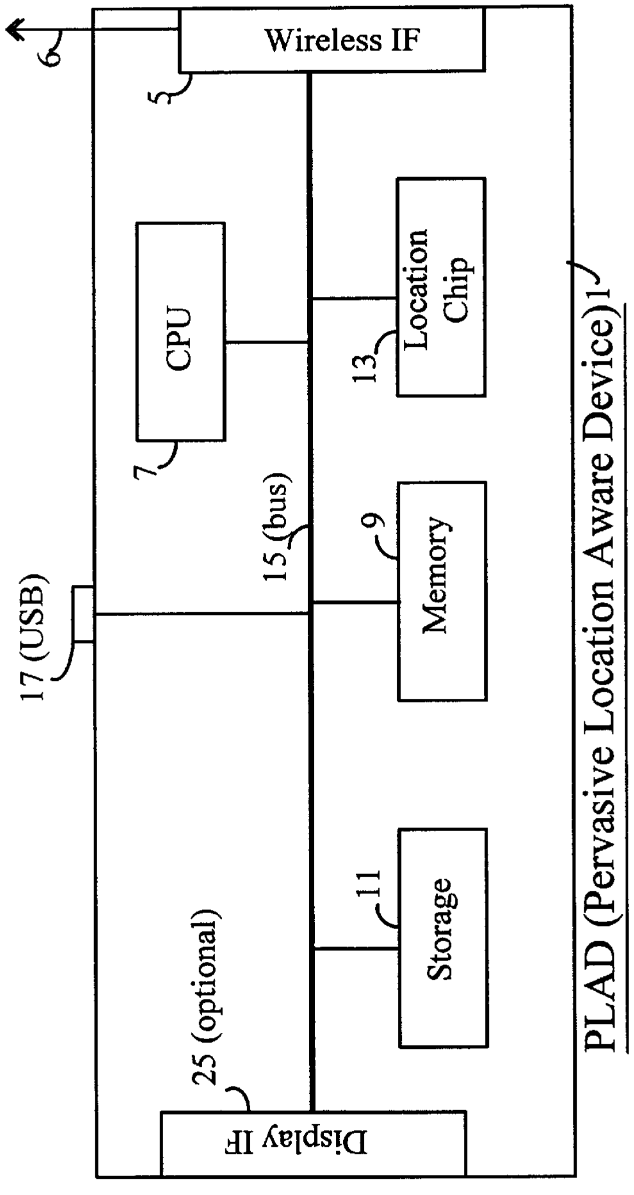
FIG. 1 is a schematic block diagram of a PLAD conforming to the present invention.

This invention pertains to a system and method for providing automated proximity-conditioned communication functions, providing users of instruments initiating such communications with special "services-on-arrival" at given sites and/or automated "services-on-departure" from such sites. Users reserving such services employ PLAD ( "pervasive location aware device") instruments that are pre-programmed in association with such reservations. Services on arrival, as presently contemplated, are arranged to be available to PLAD users arriving at a specific destination, when such users have a prior reservation and their PLAD has sent a proximity notification communication to that destination as the user approaches it and comes within a predetermined range of proximity to it. A presently contemplated preferred form of a PLAD is shown in FIG. 1.

PLAD 1 contains a wireless interface 5 linked to radio antenna 6. While the device user is en route to a specific business establishment at which the user has made a reservation for special service, PLAD 1 operates its wireless interface to send proximity notification signals to the destination establishment. Such signals, which contain address information pertaining to the destination and information identifying the device user, are sent only when the user is within a predetermined proximity to the destination. The predetermined proximity generally is established by the business offering the service, and also may be associated with the type of service involved. PLAD 1 also contains a programmable digital computer system—including processor 7, memory 9 and storage 11—and a location determining element 13. Preferably, components 7, 9, 11 and 13 are highly concentrated, e.g. on single integrated circuit chips, to ensure device portability. Components 5, 7, 9, 11 and 13 are connected by a bus 15 having a connection to a program/data loading port indicated at 17. The port may be a USB (Universal Serial Bus) if the PLAD is to be programmed by attachment to a personal computer, or it can be a simple telephone connector if programming of the device is to be effected through a standard connection to a telephone network.

Optionally, PLAD 1 may include a display element 25, which may be either an interface to a display monitor or include the monitor.

Figure 2:
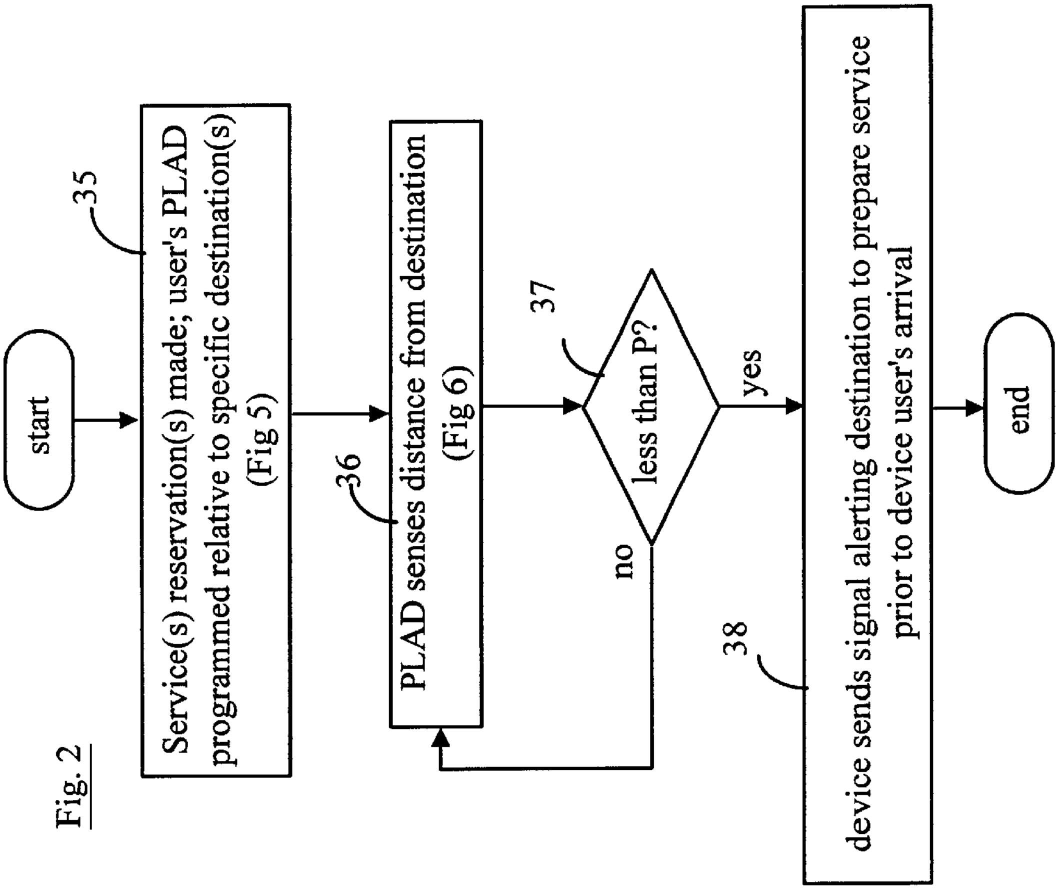
FIG. 2 is a flowchart for explaining how the device shown in FIG. 1 is used.

The manner in which PLAD 1 is used is suggested in FIG. 2. Prior to a trip by the device's user, wherein a planned stop is to be made at a given destination offering a service of the type presently envisioned, the device is programmed for communication with equipment at the destination (process 35). The program may be downloaded to the PLAD through a public network; e.g. through the public telephone network, the Internet, etc. The program may be provided by an enterprise operating at the destination (commercial business, educational institution, etc.) or by an enterprise that is an agent of the destination enterprise.

If stops are to be made at more than one such destination, the PLAD is programmed relative to each destination prior to the trip. Details of how this programming is effected are given later (refer to description of FIG. 5).

Figure 6:
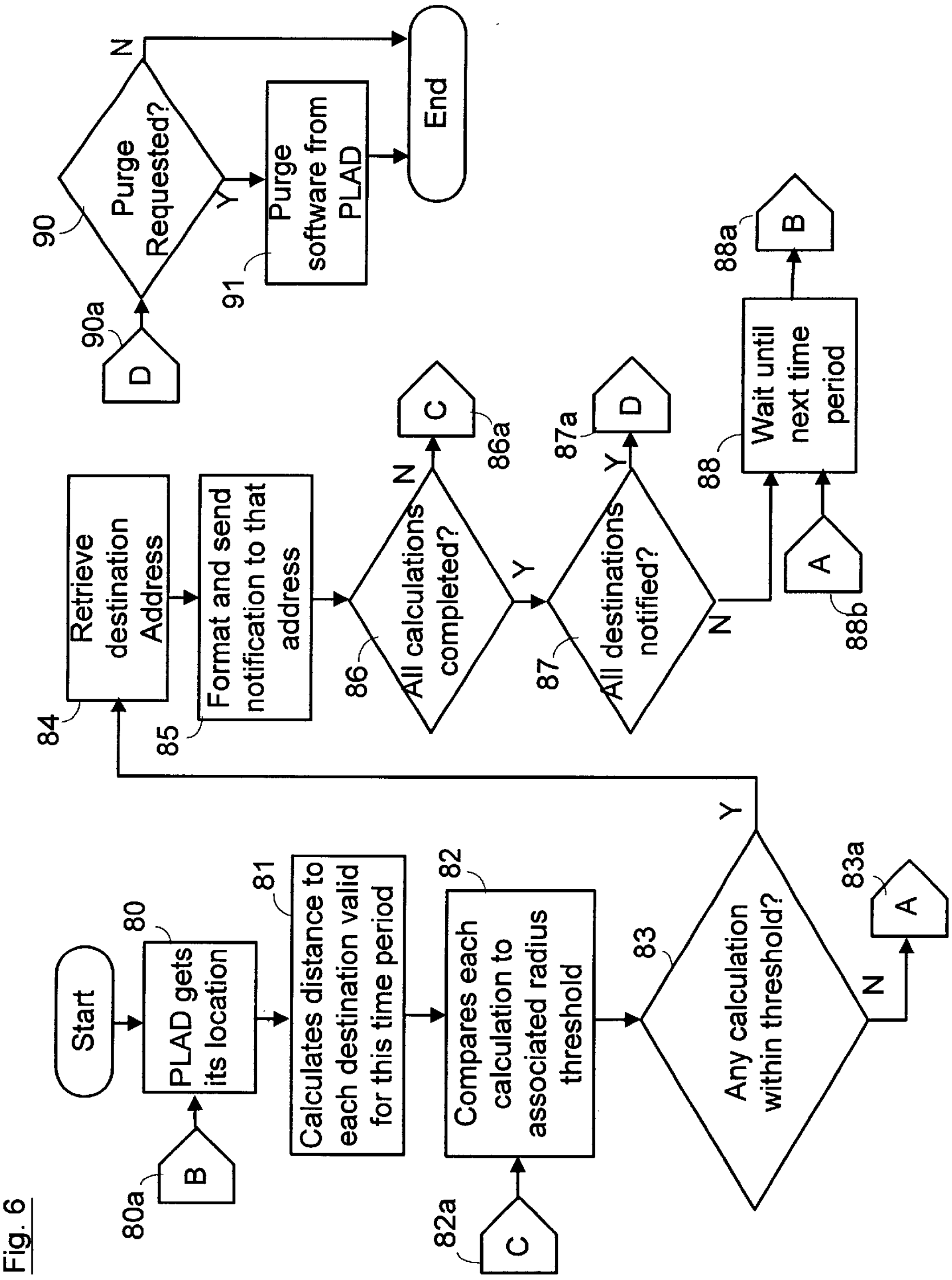
FIG. 6 is a flowchart for explaining details of how a presently contemplated PLAD operates to implement proximity-notification(s) relative to destinations at which presently contemplated "service-on-arrival" functions have been reserved

While the user is en route to a planned destination, the PLAD is activated and begins to sense its proximity to the given destination (process 36, described further below in reference to FIG. 6). This may be accomplished directly through the operation of a global positioning system (GPS), contained in location chip 13, which operates in a presently well-known manner through a not-shown satellite signal reception antenna to sense displacements relative to plural geo-stationary earth satellites. Alternatively, it may be accomplished through a wireless connection to a cellular telephone system which provides a locating service (based e.g. on signal strengths received from the PLAD at multiple differently located antennas).

When the device senses or derives indication that it is within a predetermined threshold distance P of the given destination (decision 37), it begins to emit a proximity notification signal through its antenna 6. This signal—addressed specifically to equipment located at or operating in behalf of the destination—includes data identifying the PLAD and its authorized user. It also may include information identifying the reserved service. Distance P is set during the device's programming (step 35).

Figure 3:
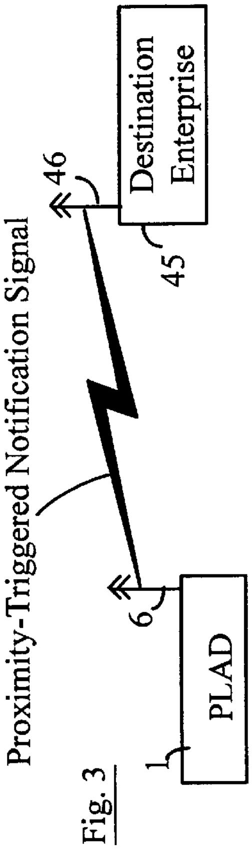
FIG. 3 is a schematic for explaining how a PLAD communicates with service destinations.

The proximity notification signal is received at a site associated with the device user's destination (e.g. the destination per se or at a site maintained by an agent of the party operating at the destination), and used there to initiate preparation of a service to be provided to the PLAD's user, which service should be fully effective at or before the user's arrival at the destination (process 38). As shown in FIG. 3, an enterprise responsible for implementing service at the destination, or an agent of such enterprise, maintains communication equipment 45 for receiving and responding to signals sent by PLAD 1. If the link between equipment 45 and PLAD 1 is wireless, equipment 45 would require the antenna suggested at 46. However, it is understood that if equipment 45 has a wired connection to some (not-shown) equipment through which signals are transferred between PLAD 1 and equipment 45, the antenna 45 would not be needed at the location of equipment 45.

A PLAD such as 1 also could be used in a "reverse" context, while its user is stationary and awaiting an approaching service vehicle (e.g. taxi, limo, package delivery truck, etc.), to alert its user to the service vehicle's proximity. In this usage, a PLAD in the approaching vehicle would send a notification signal to the PLAD at the user's location, and the latter PLAD might, for instance, return signals verifying the identity of its user and readiness of that party to receive service.

In another reverse type of context, a PLAD could be programmed to provide a distance-dependent notification as its user travels away from a given site; e.g. a notification relative to a user's home which could be used to check the status of security systems and appliances in the home and either arm security systems accidentally left off, turn off lights and other appliances, adjust temperature control settings, close automatic garage doors accidentally left open, etc.

The form of the proximity notification signal is not considered critical to the invention. It should, as previously noted, contain the address of the destination receiver, the identity (and reservation number, if pertinent) of the user of the sending PLAD, and, if applicable, the date and estimated time of delivery of the reserved service. The signal could be repeated, either continuously or intermittently. The manner in which the signal is terminated also is not considered significant. For instance, termination could occur in response to an acknowledgment signal sent from the destination receiver, or after a predetermined number of repetitions of the notification signal, or at a predetermined time after a given transmission.

Figure 4:
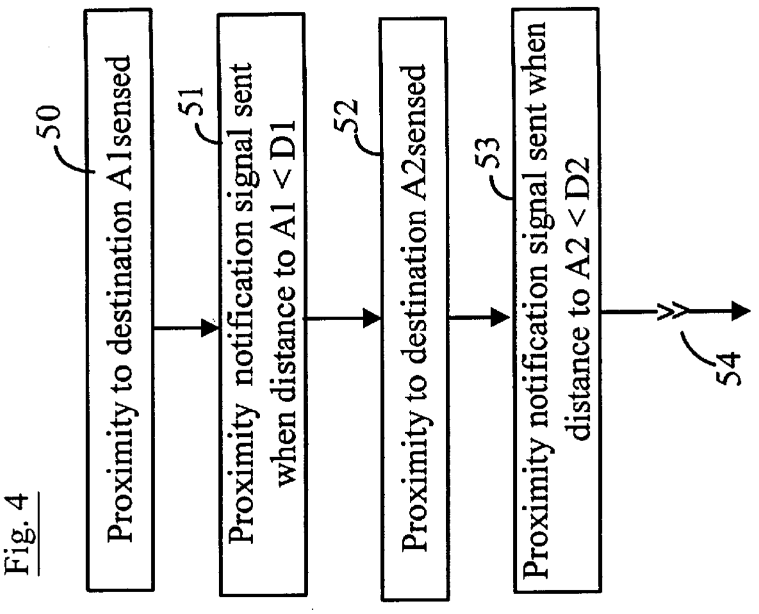
FIG. 4 is a flowchart for explaining details of operations of a PLAD relative to plural destinations that are scheduled to provide "services-on-arrival" to an authorized user of the PLAD

If the PLAD user is en route to a series of destinations, each offering a service of the kind presently contemplated, the device should be pre-programmed relative to each destination, and repeat the process 36–38 relative to each, as suggested in FIG. 4. Thus, in this type of process, a PLAD would sense proximity to a first destination A1 (process 50) and send a proximity notification signal relative to A1 when the PLAD is within a predefined range of proximity D1 to A1 (process 51). The PLAD also senses its proximity to second destination A2 and sends notification signal relative to A2 when it is within predetermined proximity range D2 of A2 (processes 52, 53). Repetitions of these functions relative to other destinations (A3, A4, etc) are suggested by continuation indication 54.

As will be seen in the description below of FIG. 6, the proximity sensing functions relative to plural destinations can all be performed concurrently, with proximity notification transmissions issued relative to each destination only as the PLAD reaches a predetermined range of proximity to that destination.

Details—Reservation and En Route Processes

Details of processes relevant to reservation of presently contemplated services are described below with reference to FIG. 5, and relevant details of proximity sensing and notification transmission operations are described with reference to FIG. 6.

A. Reservation Processes

Figure 5:
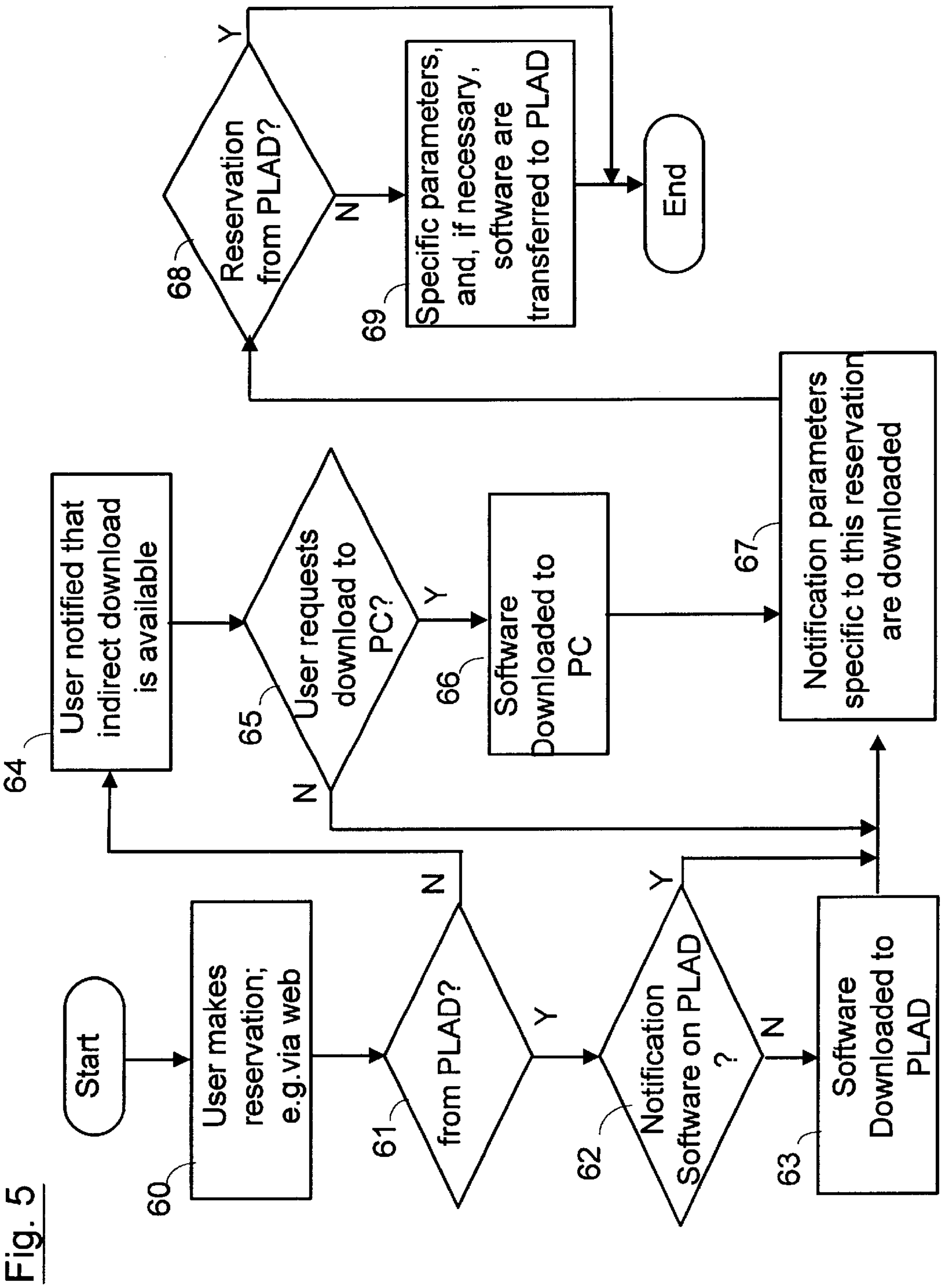
FIG. 5 is a flowchart for explaining details of how programs for providing proximity notification, and notification parameters relevant to individual programs, are loaded into presently contemplated PLAD's.

Details of reservation processes, in which proximity notification software and/or parameters pertinent thereto are transferred to a PLAD, are shown in FIG. 5. When a PLAD user contacts a business (or agent of such) to reserve a service subject to automatic proximity notification (e.g. via the Internet/web as suggested at 60), the contacted party determines if the reservation is being made directly through a PLAD (positive indication, decision 61) and if the software application required for proximity notification is not currently resident in the storage of the PLAD (negative result, decision 62). If both conditions are met, the contacted party downloads the software and proximity parameters pertinent to the reserved service directly to the user's PLAD (process 63); pertinent parameters including e.g. the location of the destination in absolute geographic coordinates, and a proximity range limit in relation to that location at which the PLAD is to begin proximity notification signaling.

If the reservation is not being made directly through the PLAD (negative decision 61), the user is notified that the software can be downloaded indirectly to a computer (process 64). If the reservation is being made through a computer, and if the reserving party chooses to accept indirect downloading (positive decision 65), the notification application software is downloaded to the computer (process 66). Along with the software, proximity parameters pertinent to the specific reservation are downloaded to the computer (process steps 67 to 69). It is understood, that software and parameters indirectly downloaded to a computer in this manner must subsequently be transferred to the reserving party's PLAD through USB ports of that device and the computer (see FIG. 1).

Transfer of software and pertinent proximity notification parameters to a user's PLAD is executed in steps 67 to 69. In step 67, pertinent notification parameters are downloaded indirectly to a computer. In step 69, information (software and parameters) indirectly downloaded to a computer (negative decision 68) is transferred to the user's PLAD. Furthermore, when a reservation is made directly through a PLAD in which the software needed has been previously stored but potentially lacking notification parameters appropriate for the service currently being reserved (positive decisions at both 61 and 62), process step 69 is used to directly download the appropriate notification parameters to the PLAD.

Consequently, after step 69, the PLAD will contain the software application and notification parameters needed for the reservation just made, regardless of whether the information is downloaded to the PLAD directly or downloaded to a computer indirectly and subsequently transferred to the PLAD.

B. Proximity Sensing and Notification Transmissions

Details of proximity sensing and notification signaling processes—performed by a PLAD relative to remote receiving apparatus associated with pre-existing reservations—are discussed with reference to FIG. 6.

Initially (process 80), the PLAD senses its location in absolute earth coordinates; e.g. by known techniques of signaling relative to geo-stationary earth satellites; or by communications with a cellular telephony center having ability to calculate PLAD location by measurements of signal strengths received at plural antennas, and ability to return signals to the PLAD directly indicating its location. The connection symbol at 80*a*, labeled "B", indicates connection to initial process 80 from another portion of FIG. 6 having a similarly labeled output connector symbol (see discussion below of symbol 88*a*).

Using the information acquired at 80, and destination position information obtained during the reservation associated processes of FIG. 5, the PLAD calculates the distance between it and each of the destinations currently valid (process 81), and compares each calculated distance to a predetermined threshold radius of proximity to the respective destination (process 82) acquired by the PLAD in the processes of FIG. 5. Input connection symbol "C" at 82*a* indicates connection to processes 82 from elsewhere in FIG. 6 (see discussion below of symbol 86*a*).

Decision 83 follows, based on the comparison of step 82. If the PLAD is in the proximity radius of a currently valid destination (positive decision 83), some or all of process steps 84 through 87 are performed. If decision 83 is negative, the process branches—via outgoing connection symbol 83*a* and input connection 88*b*—to process function 88. At 88, the process waits for the start of a next period of location sensing and proximity calculation. As indicated by connection symbols "B" at 88*a* and 80*a*, at the start of this next time period, proximity determining steps 80 and 81 are repeated.

If the PLAD is in the predetermined proximity range of a valid destination (positive decision 83) it retrieves the destination address acquired during the reservation process (step 84), formats a proximity notification communication directed to that address, and transmits signals representing that communication to that address (step 85).

After step 85, the PLAD determines if proximity calculations relative to all currently valid destinations have been completed (decision 86). If all calculations have not been completed, the process returns to comparison step 82, via connection symbols "C" at 86*a* and 82*a*. If all calculations have been completed (positive decision 86) the PLAD determines—decision 87—if all destinations have been notified (i.e. if the PLAD has traveled through proximity ranges of all valid destinations).

If proximity notifications have not been sent to all destinations (negative decision 87), step 88 is performed to begin another period of proximity determination via step 80. If all destinations have been notified (positive decision 87) the process advances to decision 90 via connection symbols "D" shown at 87*a* and 90*a*.

At decision 90, the PLAD determines if the software it loaded in association with earlier reservation processes is required to be purged/erased or saved for possible future re-use. If the software is not to be saved it is removed/erased from PLAD storage at step 91 terminating all further proximity processing. If the software is to be saved, step 91 is skipped and the current processing activities end.

Additional Examples

In addition to examples of services and/or functions already mentioned, other examples of forms and uses for presently contemplated PLAD's are:

- such PLAD's could be integrated with 2-way pagers enabling paging stations or companies to track locations and appointments of PLAD's, and perform notification functions relative to destination sites as respective PLAD's pass predetermined thresholds of proximity to respective sites at or near respective appointment times (e.g. use of paging stations as agents, in this manner, could simplify programming of PLAD's linked thereto)
- such PLAD's could be programmed to communicate with multiple sources during travel to a single site (e.g. with a toll booth operating entity along the travel route, to facilitate automatic payment of tolls and efficient movement through toll collection points)
- such PLAD's could be programmed with multiple thresholds of proximity relative to one destination; e.g. to provide diverse notifications relative to the destination as a device passes successively closer thresholds of proximity (that for example enabling the provider of a service or function at the destination to more efficiently time the preparation of that service or function)

Other Relevant Considerations

Functions described above can be realized in hardware, software and combinations thereof. Software associated with such functions can be transferred to a respective PLAD either directly from remote equipment associated with a destination at which a service is reserved or indirectly through a computer system available to a user of the respective PLAD and having links for connecting to both the remote equipment and the respective PLAD. Such software transfers from remote equipment, to either a PLAD directly or a computer system indirectly, can be made through a public communication network such as the public telephone system or the Internet and through private communication networks where appropriate.

Software associated with such functions generally will include computer programs and proximity notification parameters applicable to individual destinations. These programs and parameters can be expressed in any language, code or notation containing suitable computer instructions, they can be stored in any storage media suited for storing such information, and they can be transmitted over any communication media suited for carrying signals representing such information (e.g. in downloading transmissions described in FIG. 5).

In accordance with the foregoing, I claim the following.

What is claimed is:

1. A PLAD (pervasive location aware device) communicating instrument, said instrument enabling a user thereof to coordinate implementation of a broad variety of services at multiple remote sites at which said user may conduct different business transactions, and wherein coordination of said services is based on varied relations of proximity of said PLAD instrument to said sites; said PLAD instrument comprising:

means for communicating directly with individual ones of said sites;

means cooperative with said communicating means for storing diverse program applications associated with services to be performed at said sites; each application enabling said PLAD to detect when it is within a variably determined range of proximity to a site associated with the application, determination of said range being set as a variable function by the respective application; and means responsive to detection that the respective PLAD instrument is within said variably determined range of proximity to a site associated with a said application for initiating proximity notification communications between said PLAD and said associated site; said communications serving to activate a process at said associated site to provide a service to the user of said instrument while said user is at a known distance from said site; efficient preparations of said service at said multiple sites involving lead time factors that are related to proximity ranges which are variably set by multiple applications associated with said sites; as a result of which said time factors can be different from each other at different said sites.

2. A PLAD instrument in accordance with claim 1 wherein said program applications are stored in modifiable form, whereby said applications and data specified therein can be modified in association with currently relevant sites as their usage relative to formerly relevant but currently irrelevant sites is not required; and wherein said program applications and data specified therein are subject to modification by communications with sources external to the respective instrument, in association with reservations of functions to be performed at currently relevant sites.

3. A PLAD instrument in accordance with claim 1 wherein said proximity notification communications instigated by each said program application includes information which is contained in the application and serves to identify a reservation associated with a particular service function scheduled to be provided to said instrument's user at a site with that application.

4. A PLAD in accordance with claim 3 wherein said proximity notification communications instigated by each said application include information indicating the respective PLAD'S actual location in relation to a site associated with that application.

5. A PLAD in accordance with claim 1 wherein said means for storing said program application is capable of simultaneously storing plural program applications associated with plural different service sites.

6. A PLAD in accordance with claim 5 wherein said plural program applications and said proximity detecting means are useful to apply different proximity range limits, relative to respective sites associated with individual said applications, thereby to determine when the respective PLAD is within different thresholds of proximity to said respective sites.

7. A PLAD in accordance with claim 6 wherein service functions reserved at said plural sites can be different in character, and wherein said notification communications include transmissions from said PLAD enabling receiving equipment at said sites associated with individual ones of said plural destinations to prepare for execution of respective different functions at respective sites.

8. A PLAD in accordance with claim 5 wherein said means for storing said program applications is effective to receive said program applications via communications with sources associated with said plural sites, and wherein program applications received from said associated sources are suitable for providing proximity notifications within proximity ranges commensurate with service functions to be performed at respective sites.

9. A PLAD in accordance with claim 1 wherein said means for storing said program applications is able to store a said application in a reusable form, whereby the same application can be used repeatedly, at different times, relative to one associated site.

10. A PLAD in accordance with claim 1 wherein said stored program applications allow use of said PLAD alternatively while the respective PLAD is in motion relative to a stationary site representing a destination at which execution of a service has been reserved and also while the device is stationary at a location to which a service is being delivered.

11. A PLAD in accordance with claim 1 wherein side means for effecting proximity notification communications is capable of exchanging information with said sites pertinent to services to be performed at said sites, as directed by said associated applications, so that different services, involving different preparation lead times, can be efficiently prepared at said sites.

12. A PLAD in accordance with claim 11 wherein said pertinent information is useful to indicate alternate routes to a site currently communicating with said PLAD.

13. A system for providing a variety of proximity-dependent services comprising:

elements for receiving proximity notification signals from portable PLAD (pervasive location aware device) instruments carried by users of said services; each said instrument being programmable, in association with said services to be provided, to: a) determine their locations relative to plural different sites, and b) issue said proximity notification signals only when respective instruments are in program-specifiable ranges of proximity to individual ones of said sites; and means responsive to said proximity notification signals to coordinate execution of said services with arrival of the respective instrument at various predetermined distances from said individual sites.

14. A system according to claim 13 for providing various services wherein at least one of said predetermined distances is 0.

15. A system according to claim 13 for providing various services wherein at least one of said predetermined distances is substantially greater than 0.

16. A system according to claim 13 wherein said various services include services to be performed directly for a user of said PLAD on specific dates at specific times, wherein said PLAD is programmable to provide proximity notification signals indicating said specific dates and times, and wherein at least one of said predetermined distances is 0.

17. A service providing system according to claim 15 wherein said services include services to be performed in respect to equipment located at said sites.

18. A method for providing a variety proximity-dependent services comprising:

receiving proximity notification signals from portable PLAD (pervasive location aware device) instruments; said instruments being carried by users of said services and programmable to: a) determine their locations relative to plural program-specifiable remote sites, and b) issue said proximity notification signals only when respective instruments are in program-specifiable relations of proximity to individual ones of said sites; said program-specifiable proximity relations constituting variable distances associated with preparation of varied services at said individual sites; and in response to reception of said proximity notification signals at a said site, coordinating implementation of a said service with arrival of a respective said instrument at said relation of proximity to the respective site, provided that a said service has been scheduled at the time of reception of said signals.

19. The method of claim 18 wherein said predetermined relation of proximity is at said respective site, and said notification signals include information identifying a date and time of a service scheduled for a user of said instrument.

20. The method of claim 18 wherein said predetermined relation of proximity is at a program-determined variable distance removed from said site, and said notification signals include information identifying a date and time of a service scheduled for a user of said instrument; said variable removed distance being associated with a varied time required for efficient preparation of said scheduled service.

21. For a programmable PLAD (pervasive location aware device) instrument, a program transferable to said instrument from a network to which said instrument is connected, said program comprising:

elements for conditioning said instrument to determine its location relative to a remote site represented by a variable specified in said program; and elements responsive to determination that said instrument is within a specific range of proximity to said specified site, said range being specified as a variable by said program, for conditioning said instrument to transmit signals to said specified site via said network, said signals containing information specified as variables by said program, said information indicating said instrument is within said specified range of proximity and a date and time of a service scheduled to be performed at said specified site for a specified user of said instrument.

22. A program in accordance with claim 21 wherein said program is transferable to said PLAD instrument through a communication network from a source associated with said specified site.

23. A program in accordance with claim 21 wherein said specified site is one at which performance of a service, at a date and time indicated by said program, has been reserved for a user of the respective PLAD identified by the program-derived information contained in said proximity notification signals.

24. A program in accordance with claim 23 wherein said relation of proximity is set so as to time the issuance of said proximity notification signals in a manner effective to coordinate performance of said reserved service with arrival of the user of said PLAD at said respective site.

* * * * *